E. REEVE.
CHANGE SPEED GEARING.
APPLICATION FILED SEPT. 25, 1918.
1,316,740.
Patented Sept. 23, 1919.
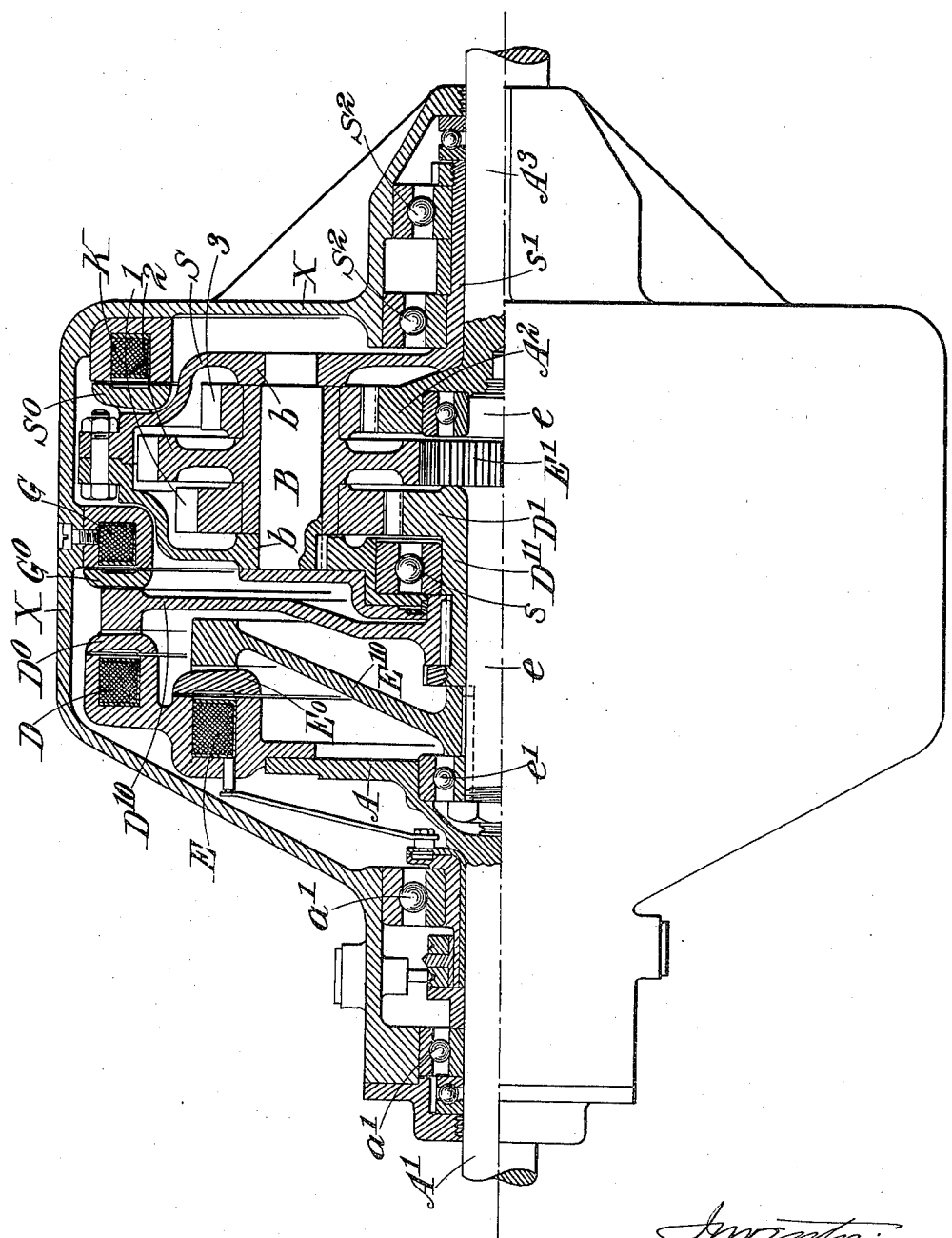

UNITED STATES PATENT OFFICE.

EDWARD REEVE, OF BIRMINGHAM, ENGLAND, ASSIGNOR TO THE MENCO-ELMA SYNDICATE LIMITED, OF LONDON, ENGLAND.

CHANGE-SPEED GEARING.

1,316,740.　　　　　Specification of Letters Patent.　　Patented Sept. 23, 1919.

Application filed September 25, 1918. Serial No. 255,554.

*To all whom it may concern:*

Be it known that I, EDWARD REEVE, a subject of the King of England, residing in Birmingham, England, have invented certain new and useful Improvements in Change-Speed Gearing, of which the following is a specification.

This invention relates to change speed gearing of the spur epicyclic type in which the change of speed ratios is effected by the aid of electromagnetic clutches, the gear being more especially, but not exclusively, intended for use on motor vehicles.

One form of an electro-magnetic change-speed and reverse gear of the spur-wheel epicyclic type according to this invention is characterized by a construction such that the three co-axial sun-wheels employed therein, two driving and one driven, are not only co-axial but are of three different sizes; that the driven sun-wheel is larger than the other two; and that the three planet-wheels which gear with them (*a*) are rigidly connected to one another and turn about a planetary axis parallel to the axis of the suns, and (*b*) have the smallest of the three planets geared to the largest of the three suns whereby a reverse is obtainable as well as three forward speeds in the manner hereinafter explained; and that two of the forward speeds are obtained by holding stationary the support of the planetary shaft.

The accompanying drawing is a side elevation, partly in vertical central longitudinal section of a three-suns type of gear according to this invention.

It is to be understood that in the drawing the electro-magnetic clutches and brakes are indicated diagrammatically only and that the details of their construction and of the mounting of their armatures are not of the present invention and may be of any convenient type.

With reference to the drawing, a driving shaft $A^1$ which may conveniently be operated by petrol motor, turns in ball-bearings $a^1$ in the fixed stationary casing X of the mechanism. Two driving sun-wheels $D^1$ $E^1$ of different diameters, are free to turn independently of the driving shaft $A^1$ with which they are co-axial. The smaller wheel $E^1$ of these two is fixed on a spindle $e$ which is supported at the left-hand end by ball-bearings $e^1$ supported in a cavity in a disk A secured to the right-hand end of the driving shaft $A^1$. The right-hand end of the spindle $e$ is suported in the hollow left-hand end of the driven spindle $A^3$. The larger, $D^1$, of the two sun-wheels $D^1$ $E^1$ is provided with a sleeve $D^{11}$ which encircles and can turn in relation to the spindle $e$ by which it is supported. The driven spindle $A^3$ which turns in a sleeve $s^1$ hereinafter described, can be connected in any suitable manner to, say, the road-wheels of an automobile vehicle, or to any other device which the change-speed gear is to actuate. The circular electro-magnets D and E of two electro-magnetic clutches are fixed to and turn with the disk A of the driving shaft $A^1$; the armatures $D^0$ and $E^0$ of these clutches D and E turn respectively with the disk $D^{10}$ fixed to the sleeve $D^{11}$ of the sun-wheel $D^1$ and with the disk $E^{10}$ fixed to and turning with the spindle $e$. Current conveyed by any suitable means to the electro-magnets D and E, or either of them, enables the suns $D^1$ and $E^1$, or either of them, to be clutched to the disk A so as to turn with it and the driving shaft $A^1$.

A stationary circular electro-magnet G is fixed to the casing X and with the armature $G^0$ carried on the disk $D^{10}$ aforesaid, forms an electro-magnetic brake which when energized, holds the disk $D^{10}$ stationary and with it the larger $D^1$ of the two driving sun-wheels $D^1$ $E^1$.

A third sun-wheel $A^2$, hereinafter termed the driven sun-wheel, is fixed to the driven shaft $A^3$; it is co-axial with but larger than the other two sun-wheels $D^1$ $E^1$ in order that it may coöperate with the smallest of three planetary wheels hereinafter referred to for the purpose of effecting a reverse drive of the driven shaft $A^3$, in the manner hereinafter described.

A planetary spindle B parallel to the driving and driven shafts $A^1$ and $A^3$ is mounted in bearings $b$ in a support S which turns about an axis that is co-axial with the driving shaft. This support rotates on bearings which at its left-hand end are constituted by the ball-bearings s supported on the outside of the sleeve $D^{11}$, and at its right-hand end where it is provided with the sleeve $s^1$, it is borne on ball-bearings $s^2$ in the fixed casing X. On the planetary spindle B are three planetary pinions 1, 2, 3 which rotate on it and are fixed to one another and co-axial with it. These pinions gear respectively with the three sun-wheels $D^1$ $E^1$ $A^2$.

A stationary annular electro-magnet K is fixed to the stationary casing X; its armature $S^0$ is fixed to the rotatable support S, and by energizing the electro-magnet K the support S can be locked to the stationary casing X when required, when it is thus locked, two of the forward speeds of the gear are obtained, as will be hereinafter described.

The operation of the device illustrated in the drawing will now be described. To obtain the first forward speed the brake electro-magnet K is energized. This holds the support S stationary. The clutch E $E^0$ is energized, whereupon the driving-shaft $A^1$ drives the smaller sun-wheel $E^1$ which in turn rotates the planet-pinion 2; the planet-pinion 3 turning with 2, being in gear with the sun $A^2$ rotates the latter and the driven shaft $A^3$ with the same sense of rotation as that of the driving-shaft $A^1$.

To obtain the second forward speed, the support S is held stationary as before by the brake K, but the clutch D is energized instead of the clutch E, whereupon the larger of the two sun-wheels $D^1$ is turned with the driving shaft and rotates the planet-pinion 1, which turning with the connected planet-pinion 3, rotates the driven sun-wheel $A^2$ and shaft $A^3$ faster than in the previous case, but in the same direction.

For the third forward speed a through or direct drive is obtained by energizing the clutches D and E simultaneously and releasing the brake K, this will result, by reason of the difference in diameter of the planetary pinions 1 and 2, in the turning of these pinions and their support bodily in a motion of translation around the axis of the driving shaft, the planetary pinion 3 being carried around with the other two and taking around with it the driven sun-wheel $A^2$ and the shaft $A^3$ at the same angular velocity as that of the driving shaft $A^1$ and in the same sense.

For the obtainment of a reverse drive for the driven shaft $A^3$, the brake G is energized; this through the armature $G^0$, disk $D^{10}$ and sleeve $D^{11}$, holds the sun-wheel $D^1$ stationary. The clutch E is energized and this brings about the rotation of the sun-wheel $E^1$ in the same direction as that of the driving-shaft. The sun-wheel $E^1$ rotates the planetary pinion 2 and with it the planetary pinion 1; the latter is thereby rolled around the rim of the stationary sun-wheel $D^1$ in the direction opposite to that in which the driving shaft is rotated. The planetary pinion 3 accompanies the planetary pinion 1 in this motion of rotation and translation and if it were of the same diameter as the latter it would leave the driven sun-wheel $A^2$ stationary; but as it is of smaller diameter than 1, it takes the driven sun-wheel $A^2$ with it in the motion of translation, in the same direction as that motion, namely a direction opposite to that in which the driving shaft $A^1$ turns.

Thus it will be seen that in this construction two forward speeds are obtained by holding stationary the support S, a third forward speed (the direct drive) being obtained by taking the wheels $D^1$, $E^1$ and the pinions 1, 2, 3 around bodily with the support S and the reverse being obtained by freeing the support so that it and the wheels in it can travel backwardly under the action of the unreversed sun-wheel $E^1$ while the sun-wheel $D^1$ remains stationary.

Though only one planetary shaft B is shown in the drawing it is to be understood that there may be several of these shafts and the pinions on them, set parallel with one another at suitable equal angular intervals apart around the main axis of the mechanism, as is common in epicyclic gears.

In the construction shown in the drawing the gear-wheels are all inclosed in the support S which is a hollow casing; this can easily be made oil-tight so that the gear may be run in a lubricant of a kind different from that employed for the clutches, so that the best lubricant can be selected for the different conditions of working in the gear and in the clutches.

What I claim as my invention and desire to secure by Letters Patent is:—

In an electro-magnetic change-speed and reverse gear of the spur-wheel epicyclic type comprising a driving-shaft, two driving sun-wheels $D^1$ $E^1$ of different diameters loose and turning on bearings that are co-axial with the driving shaft, two rotatable electro-magnetic clutches whereby they may be clutched to and released from the driving shaft selectively and collectively, and a stationary electro-magnetic brake whereby the larger of the two driving sun-wheels can be locked to and released from the stationary casing of the mechanism, the employment in combination therewith of a driven sun-wheel $A^2$ co-axial with but larger than the other two sun-wheels, a planetary spindle parallel to the driving shaft support which turns about an axis that is co-axial with the driving-shaft, bearings on the support for the said planetary spindle to revolve in three planetary pinions 1, 2, 3 on and co-axial with the said planetary spindle which pinions are connected to one another and gear respectively with the three sun-wheels $D^1$ $E^1$ $A^2$, and another stationary electro-magnetic brake whereby the support aforesaid is locked to the stationary casing of the mechanism for the obtainment of two of the forward speeds as hereinbefore described.

In testimony whereof I have signed my name to this specification in the presence of two subscribing witnesses.

EDWARD REEVE.

Witnesses:
  A. JACOB,
  J. ENGLISH.